INVENTORS
GEORGE C. REID
EUGENE FINDL
DOUGLAS G. MARLOW
ARTHUR T. YAHIRO
BY
Ronald Zibelli
ATTORNEY

United States Patent Office 3,526,480
Patented Sept. 1, 1970

3,526,480
AUTOMATED CHEMICAL ANALYZER
Eugene Findl, Granada Hills, Douglas G. Marlow, Arcadia, Arthur T. Yahiro, West Covina, and George C. Reid, Glendora, Calif., assignors to Xerox Corporation, Rochester, N.Y., a corporation of New York
Filed Dec. 15, 1966, Ser. No. 603,404
Int. Cl. G01n 33/16
U.S. Cl. 23—253
40 Claims

ABSTRACT OF THE DISCLOSURE

Automatic chemical analyzer wherein measured portions of sample material are transferred from a sample carrier to discrete reagent-containing sites on an analytical tape. The apparatus is particularly adapted for the transfer of a plurality of measured portions from a single storage site to a plurality of different discrete reagent-containing sites. Apertured analytical tapes are described as well as reagent-containing sites which have the reagents chemisorbed therein.

---

This invention relates to automatic chemical analysis and, more particularly, the invention relates to the automatic chemical analysis of body fluids, such as blood, urine, etc.

In the past, many routine, manual laboratory procedures have been conducted upon body fluids as an aid to the physician in determining, diagnosing, or preventing the various ailments which afflict mankind. As the science of medicine progresses and becomes more sophisticated in its analysis, new laboratory procedures and techniques are developed which analyze such fluids in search for a hidden clue which will establish or negate the existence of a particular affliction.

At the same time that medical science is developing new tests to aid in pinpointing particular afflictions, the population of the United States, and of the world, is expanding at an enormous rate. New phrases, such as "the population explosion," have been coined to express this physical phenomenon which is presently occurring and will continue to occur throughout the existence of mankind. Thus, with more tests being conducted per person and more people coming in need of such tests with each passing day, it becomes evident that more people must be trained and/or new devices must be developed to meet this onrushing demand.

This problem has plagued mankind for many years and it is equally evident that the solution of training more qualified people to conduct this ever increasing amount of clinical analysis has not been equal to the task. Most clinical departments are headed by a resident pathologist or a licensed medical technologist who supervises a trained staff of laboratory technicians. As the majority of laboratory technicians are young, unmarried girls the turn-over rate is unusually high because of ensuing marriages which require the wife to devote her time to the needs of her family. The resulting manpower shortage places a limit both upon the quantity of clinical tests which can be conducted as well as the quality for, when one is burdened with an ever increasing amount of work which must be completed within a unit period of time, human errors are bound to become more prevalent.

To fulfill this ever increasing demand which is not being adequately met by our expanding technical labor supply, new devices have been developed to assist the laboratory technician in conducting a greater number of tests per unit time. Many of these devices took the approach of merely mechanizing, or automating, the purely manual operations of the ordinary clinical chemist or analyst. Exemplary devices of this type are shown by Hewson U.S. No. 2,560,107; De Seguin Des Hons U.S. No. 3,143,393; Baruch in U.S. Nos. 3,193,358 and 3,193,359; and Natelson U.S. No. 3,219,416. This approach results in a device having test tubes, funnels, reagent containers, pumps and other associated means for bringing a particular sample and the necessary reagents together to perform a desired analysis. Though the devices unquestionably perform more analyses per unit time the devices, as a whole, are subject to other objections which are similar to those stressed when a technician manually performs the analytical procedures. That is, the repetitious use of the same laboratory equipment for a plurality of distinct analyses poses the problem of contamination. To overcome this detrimental aspect a significant portion of the operating time of the devices must be allocated to the repetitious cleaning of the equipment to provide a clean environment for subsequent tests. As a result, the efficiency in terms of the number of tests which can be conducted per unit time is drastically diminished.

An additional detrimental feature of such devices, as well as other prior art devices, is the fact that they are initially programmed to perform a plurality of tests of a single type. That is, a plurality of samples are taken and a single test, for example, blood sugar, is run on each sample. The device must be reprogrammed to provide for additional tests on the remaining portions of the samples. In many instances, the devices cannot be so reprogrammed or to do so requires substantial modification or repositioning of the component parts by the operator. These modifications reduce the flexibility of the device and further diminish the improvement which can be obtained in performing purely manual procedures through mechanical means.

Additional devices suggested by Natelson, such as shown in U.S. Nos. 3,036,893; 3,216,804; 3,260,413; and 3,261,668, utilize a combination of three separate tapes to uniformly deposit a portion of a sample to be tested upon the reagent-containing tape. As described, the device is capable of performing only a single test upon a plurality of samples for each 3-tape unit utilized. To perform additional tests of a different type, the 3-tape unit must be replaced by a different unit having a different reagent-containing tape. Additionally, the operator must reset the incubation conditions existing in the treating zone to provide the proper environment for the new analysis. This modification of the apparatus may introduce significant time delays if conditions differ radically from the prior test. A further deficiency of the Natelson apparatus is that once a sample is taken from a particular holder and passed to an appropriate capillary tube, the sample holder must be stored some place if additional tests are to be conducted upon the liquid contained therein. This requires additional storage space which would not be necessary if the initial sample could be aliquoted into a separate number of smaller samples upon which each desired analysis could be run immediately. In addition to mere storing of the initial sample holder, it would also be necessary to identify each particular sample to eliminate confusing the sample of one patient with that of another patient. Therefore, time must be taken to carefully mark each particular sample holder in a predetermined pattern whereby each can be readily identified during the course of further analysis. It might be added that co-mingling of the plurality of sample holders presents additional confusion when the same number of tests are not run on all samples so that each sample does not have a singular place in a predetermined order of analysis. Thus, while the Natelson apparatus does increase the capability of the technician to perform a plurality of single tests, significant problems are presented when it is desired to expand the operation of the apparatus to the performance of a plurality of different tests on a plurality of different samples.

It is therefore an object of the present invention to provide an automated analytical apparatus and system which is not subject to the aforementioned deficiencies.

It is an object of the present invention to provide an apparatus and system for the automatic chemical analysis of fluid materials and, in particular, body fluids such as blood and urine.

It is is a still further object of the present invention to provide an apparatus and system for the automatic analysis of fluid materials which is capable of simultaneously performing a plurality of different tests on a plurality of different samples.

It is a still further object of the present invention to provide an apparatus and system for the automatic quantitative analysis of fluid materials.

A still further object of the present invention is to provide an automatic analyzer for testing fluid materials which yields quantitative data based on operations conducted upon very small samples.

It is a still further obect of the present invention to provide an apparatus and system for the automatic analysis of fluid materials which utilizes a transport member carrying a reaction site having all the necessary reagents for a particular chemical analytical test stored therein.

A still further object of the present invention is to provide an automatic analyzer for testing fluid materials which utilizes a transport tape having a plurality of reaction sites, each reaction site having one or more reagents stored therein.

A still further object of the present invention is to provide an automatic analyzer utilizing a plurality of reaction site-supporting carrier elements, each reaction site supporting element representing a prepackaged chemical testing unit.

A still further object of the present invention is to provide an automatic analyzer utilizing a plurality of reagent site-supporting transport tapes.

Yet, another object of the invention is to provide a reagent carrier with the reagent chemisorbed thereon to prevent reagent dispersion when a liquid sample contacts it.

A still further object of the present invention is to provide a plurality of novel analytical tapes. A still further object of the present invention is to provide a novel analytical tape having a plurality of reagent discs supported thereon.

A still further object of the present invention is to provide a novel analytical tape having a plurality of regularly spaced apertures therein.

A still further object of the present invention is to provide a novel analytical tape supporting a plurality of reaction sites, each reaction site having at least one chemisorbed reagent stored therein.

The above and still further objects, features, and advantages of the present invention will become apparent upon consideration of the following detailed disclosure of specific exemplary embodiments of the present invention.

The above and still further objects of the present invention are achieved by providing an automatic chemical analytical apparatus having, in its essential elements, a sample carrier including a plurality of sample storage sites, means to move said carrier past a sample transfer station, means to advance an analytical tape bearing a plurality of discrete reagent containing sites, means at said sample transfer station to transfer a measured portion of a sample from one of the storage sites to a discrete reagent containing site on the analytical tape, means to advance said sample carrier after all sample transfer is complete, and detection means further along the path of analytical tape travel to monitor one or more of the physical properties of the reaction mixture contained within the discrete reagent containing site.

In its broadest aspects, the analytical system includes a station for the storage of at least one analytical tape bearing a plurality of discrete reagent containing sites, a station for the addition of a measured portion of a sample to be analyzed to the reaction site, an incubation station wherein the reaction mixture within the porous structure of the reaction site is held for a period of time sufficient to bring the reaction mixture to the desired state for analysis, a detection station wherein spectrophotometric analysis is made of the reaction mixture, and a disposal station wherein the analytical tape bearing the used reaction site is eliminated from the system, said system including means to transport the reaction site supporting analytical tape from its storage station through the system to said disposal station.

In one embodiment, the analytical tape has a plurality of regularly spaced reaction sites thereon. Each spaced reaction site can contain the same prepackaged chemicals so that each site represents a chemical testing unit for conducting the same analytical procedure or, in the alternative, the analytical tape can support a plurality of different reaction sites, each of which has stored therein chemicals for conducting a particular chemical analytical procedure. Thus, a set of reaction sites can be supported by the analytical tape for conducting the number of analytical procedures corresponding to the number of different reaction sites within the set. In a still further embodiment, at least one of the plurality of different reaction sites is utilized in the calibration of the detection mechanism or assists in compensating for the effects that various materials have on the analytical procedure.

In a further embodiment, there are apertures in the analytical tape in between discrete reaction sites, the apertures having dimensions substantially equal to the areas corresponding to the reaction sites. A plurality of different analytical tapes are utilized, each tape having deposited thereon or impregnated therein reaction sites which are capable of being used to perform different chemical analytical procedures. In the associated apparatus, means are provided to index the plurality of tapes within the system, and specifically within the sample addition station, to position a particular reaction site in a first tape beneath the aligned apertures in the tapes, if any, above the first tape. In this manner, sample addition is made to the appropriate tape of the plurality of tapes having the proper reagents stored thereon for conducting the desired analysis. Correspondingly, means are provided in the detection station to index a reaction site ready for analysis into the optical path of a spectophotometer.

In a still further embodiment, a discrete reaction site on a supporting portion of the analytical tape is separated from the remaining portion of the analytical tape just before sample addition. After being separated from the remaining portion of the supporting analytical tape, the reaction site, now containing the transferred sample portion, passes through the analytical apparatus and system as a separate entity. Instead of a single reaction site supported by this separated portion of the analytical tape, additional reaction sites can be disposed on the supporting member to assist in the calibration of the detection mechanism as well as to provide the desired analytical data.

In a still further embodiment, a discrete reaction site, or each of a plurality of discrete reaction sites, is supported over an aperture in the underlying analytical tape. In this embodiment, the analysis in the detection station can proceed in accordance with well known reflectance techniques, as well as transmittance techniques.

In a preferred embodiment, a plurality of different analytical tapes are utilized, each tape having deposited thereon or impregnated therein regularly spaced reaction sites which are capable of being used to perform different chemical analytical procedures. As in all embodiments the reaction site, having sample and necessary reagents mixed and incubated therein, yields a distinctive photon absorption characteristic proportional to the concentration of a particular known substance in the sample material. This photon absorption characteristic can be converted, in a manner well known to the art, into a proportional electronic voltage which can be measured, stored, recorded, etc., for future reference.

The aforegoing embodiments relate to the analytical tape and the positioning of the reaction site and sites thereon. An additional aspect of the present invention is chemisorbing the reagent or reagents on the reagent carrier to prevent reagent diffusion or transfer from the reaction site when a liquid sample is added thereto. The chemisorption process is of special interest because it significantly reduces or eliminates the adverse effect called "ringing" when a body of solvent fluid is added to the reaction site.

The automatic analytical system briefly described above, and which will be described in greater detail hereinafter, has many features which clearly show the significant advance that the present invention represents over the prior art. Initially, by prepackaging the reagents within the porous matrix of the reaction site the system is given utmost flexibility without sacrificing any speed which would normally be desired in an automated system. Flexibility is achieved by providing a plurality of different tapes within the system, each tape supporting and representing a plurality of prepackaged analytical testing sites which can be selectively indexed into position in the sample addition station for deposition of a particular sample material. By providing a greater number of analytical tapes having the appropriate reagents stored thereon it is possible to select any number of different tests and run them simultaneously on a plurality of different samples. Increased speed is achieved because the system is designed to conduct different tests on different samples simultaneously. It need not be reprogrammed, portions of the machine need not be repositioned, incubation conditions need not be modified, and reagent storage vessels need not be filled or replaced. Since the reagents are stored at the reaction site, it is not necessary to provide complicated apparatus for the transportation of reagents from storage compartments thereto. Once the reaction is complete and the analytical tape has passed through the optical readout station, the tape passes from the system thus relieving technicians of the necessity of cleaning and/or repairing used equipment for subsequent testing. With these features in mind, it is believed that the significant improvement this invention represents over the prior art should be apparent.

The nature of the invention will be more easily understood when it is considered in conjunction with the accompanying drawings wherein.

Figure 1:
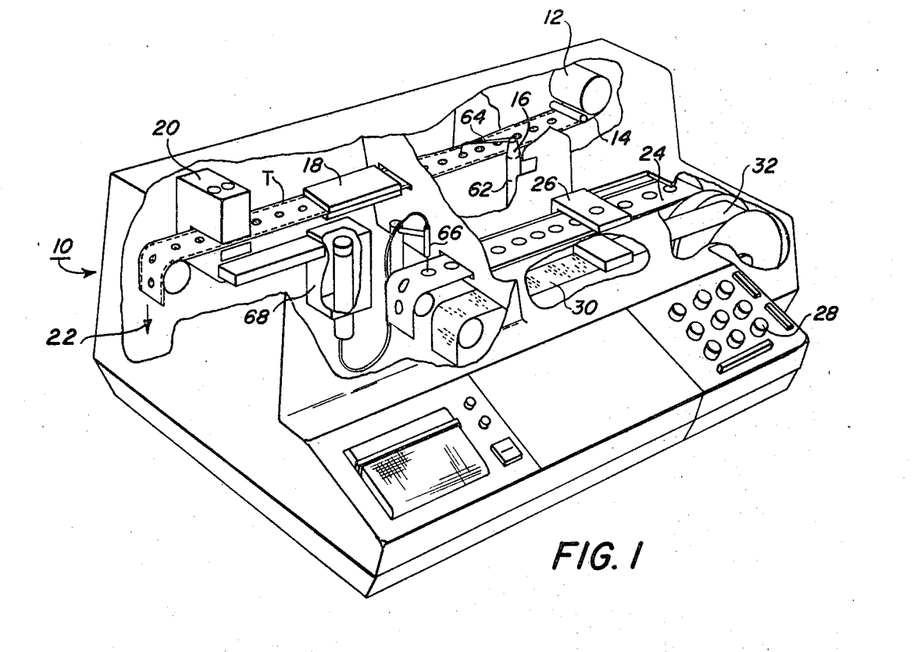
FIG. 1 is a perspective view of an automatic analytical apparatus of the present invention.
Figure 2:
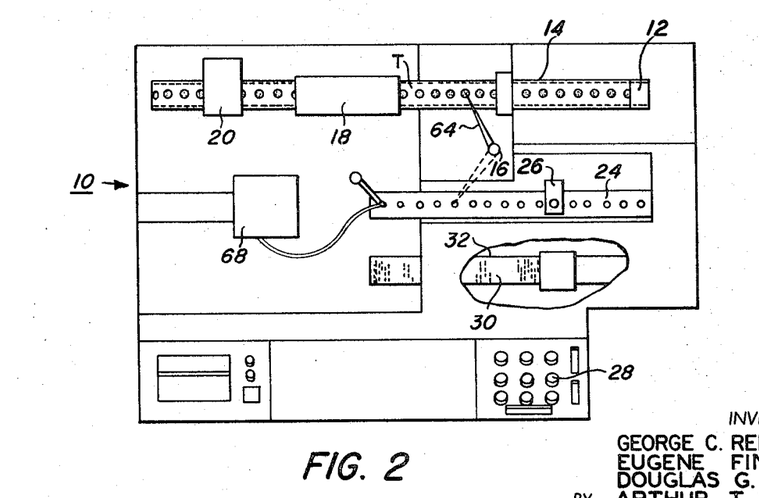
FIG. 2 is a top view of the automated apparatus of FIG. 1.
Figures 4, 5:
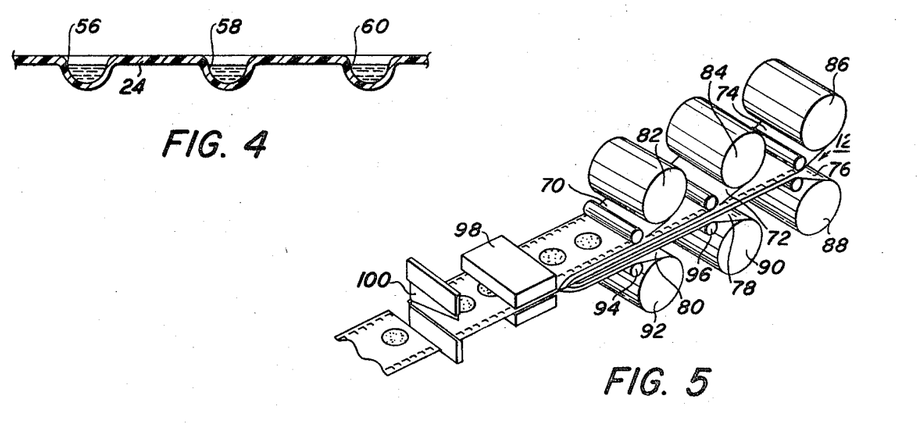
FIG. 4 is a sectional side view of a sample holding tape for utilization in the apparatus of FIG. 1.
FIG. 5 is a perspective view of a magazine for the storage of a plurality of analytical tapes.

Referring to FIGS. 1 and 2, there is seen a fully automated analytical apparatus 10 having a magazine 12 for the storage of an analytical tape 14. For simplicity, in these figures only one analytical tape T is shown being drawn through sample addition station 16, incubation station 18, detection station 20, and thereafter to disposal station 22. It should be understood, however, that for the most effective utilization of the present invention it is contemplated that a plurality of analytical tapes, as shown in FIG. 5, will be used, each tape representing a carrier for a plurality of like analytical testing sites. There is also provided a sample carrier, in the form of tape 24, for the storage of liquid samples immediately prior to the addition of the sample material to the testing site on the analytical tape. Indicator 26 is automatically positioned over the proper storage site on sample carrier 24 to indicate to the technician exactly where the next sample to be added to the sample carrier is to be placed. When carrier 24 is indexed forward to bring a new sample storage site into the transfer station, indicator 26 also moves forward and remains in registration with an underlying unused sample storage site. After a sample is manually stored in the previously unused storage site, the indicator indexes one position backward on a signal from control panel 28 to clearly indicate to the technician the next unused sample storage site for placement of a further sample to be analyzed. Control panel 28 is provided for the technician to place appropriate instructions 30 on command tape 32. Instructions 30 cause the proper analytical tape to be indexed into position in sample addition station 16 for the subsequent addition of the sample material. Such instructions are especially useful when a plurality of tapes are stored in magazine 12, each tape having different reaction sites for different analytical tests.

Figure 3:
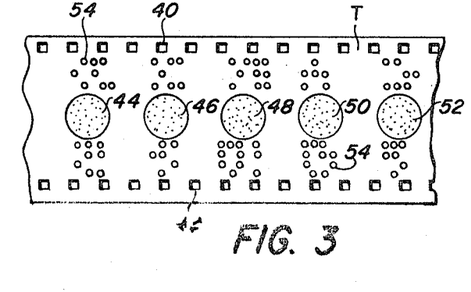
FIG. 3 is an enlarged top view of an analytical tape of the present invention.

Referring to FIG. 3, analytical tape T can be seen to have appropriate sprockets 40 and 42 therein, much like movie film, so it can be indexed from position to position. In addition to the plurality of sprocket holes, there are reaction sites 44, 46, 48, 50 and 52. The reaction sites can either be porous material which has been impregnated with appropriate reagents and bonded to tape T or, if tape T is, or can be made, sufficiently strong and is a porous material itself, the reaction site can be a portion of tape T which has the necessary reagents impregnated therein. If desired, appropriate barriers can be provided around the reagent-containing area to limit diffusion or transfer of reagent and/or sample from the test site. Further, when utilizing a reaction site which is bonded to the analytical tape, hereinafter called a reaction disc, multi-layered structures can be provided wherein each layer will correspond to one step in a series of steps to be performed during the analytical procedure. Thus, different reagents can be stored in different layers of the reaction disc and/or a filter layer capable of removing deleterious substances can be positioned in between reagent-storing layers. Multi-layer structures significantly increase the number of analytical procedures which can be performed thereby adding great flexibility to the herein disclosed apparatus and system. Analytical tape T further includes information 54, in the form of magnetic coding or punched holes, placed thereon to identify the sample being analyzed and the test being run thereon. Additionally, space can be provided adjacent a particular reaction site for the storage, in similar form, of the analytical data obtained in the detection station as the tape T passes therethrough. The totality of such information can then be read out into a storage device either associated with or separate from the detection station per se.

In operation, the reaction site-supporting analytical tape is threaded through the apparatus from the magazine storage station 12 to the disposal station 22. Each tape has a corresponding drive means (not shown) which will cause the tape to be indexed one position at a time so that the tape can be sequentially drawn through the various stations. In the sample addition station 16, the sample material which is to be analyzed is withdrawn from tape 24, an embodiment of which is shown in the FIG. 4, where it has been held in a pod 56 of pods 56, 58, 60, etc. Revolving aliquoter 62, having an arcuate measuring tube 64 oscillates in an arcuate path between sample carrier 24 and analytical tape T. Tube 64 is produced from a non-wetting material, for example polyethylene, to reduce or eliminate contamination caused by sample carryover. Positioned over sample carrier 24 the tube is lowered until the tip thereof is within the liquid sample material. A measured portion of the sample is withdrawn by a vacuum system (not shown) which operates until the measured portion completely fills the tube. With the tube filled, it rises and the aliquoter is caused to revolve until the tip of the measuring tube is positioned directly over the appropriate reaction site on the analytical tape. Slight pressure is placed on the internal end of the measuring tube forcing the liquid contents thereof out of the tube and onto the reaction site. With the sample transferred, the aliquoter is now ready for return to its initial position over a sample storage site in the sample carrier. The sample storage site can be the same storage site for transfer of at least one additional aliquoted portion of sample or a new sample storage site which has been indexed into position by the drive means (not shown) associated with the sample carrier.

From sample addition station 16 the analytical tape passes through incubation station 18 wherein the reaction mixture is maintained within the reaction site for a period of time sufficient to bring the mixture to the desired state for analysis. The incubation station should be of sufficient length or dimensions so that the reaction mixture will be held at the proper ambient conditions for the specified amount of time. The proper incubation time is achieved by causing the drive means to index at a particular rate which will bring the reaction mixture to the detection station at the proper time for analysis. In detection station 20 a beam of light is focused onto and through the reaction mixture within the reaction site supported by the analytical tape T and then to a detection unit, such as a photoelectric cell, which is responsive to the variations in light transmittance caused by varying amounts of a known constituent in the sample material. The electrical output signal, which is proportional to the amount of a particular constituent in the sample is converted into the meaningful data which, in turn, is fed into a control panel and storage device for its storage for future reference. Means are also provided to identify the particular sample as being from a particular source as well as the test being run thereon. Additionally, within the detection station the analytical data obtained can be immediately transferred to the analytical tape to provide a complete record for future reference. From the detection station, the analytical tape passes to the disposal station where the tape can be wound upon a take-up reel for storage or dropped into a disposal container, as is desired.

As an ancillary feature to the hereinabove described analytical procedure, many other kinds of detection techniques can be used in conjunction with the liquid sample material remaining in the sample storage site. For example, after the measured portions of the sample have been added to the reaction site, in the manner previously described, the sample holding tape 24 will be repeatedly indexed forward. At a station further along in the travel of this sample holding tape, a probe 66 can be lowered into the liquid sample and a fraction of this solution aspirated in the flame of the flame photometer 68. Detection proceeds using well-known flame photometric technology. Other analytical techniques which operate directly upon the liquid sample can be incorporated within the overall system and utilized to provide a more complete analysis of the sample material.

As previously indicated, the analytical tape can have a plurality of like spaced reaction sites or, in the alternative, the tape can support a plurality of different reaction sites, each of which represents a prepackaged chemical testing unit for conducting different chemical analytical procedures. In the latter case, there will be a set of different reaction sites with the set being repeated throughout the length of the analytical tape. A measured portion of the sample can be transferred from the sample storage site to each of the different reaction sites so that a plurality of tests can be run on a particular sample. In clinical blood chemistry, this would be known as a "profile" analysis.

To calibrate the detection mechanism, "standard" samples containing known amounts of the constituent under analysis are passed through the detection station. Such standards can be added to prepared areas of the analytical tape which will accept only a specified amount of standard solution and thus be suitable for calibration. The detection mechanism will analyze each standard and then adjust itself for deviations from the known value. Further, a secondary reaction site which, upon analysis, will enable the analytical detection system to correct for the effects of the sample and certain reagents added to the reaction mixture can be associated with each primary reaction site. Thus, the sample and all necessary reagents which will bring the reaction mixture to the desired state for analysis are added to the primary reaction site. The secondary reaction site will contain the material being tested either in the absence of reagents or, in certain circumstances, one or more reagents can be added to the sample material provided the reagents do not carry the reaction to completion or do not adversely affect, in any other way, the optical analysis. This latter reaction mixture is called a "critically incomplete blank" and analysis thereof will enable the analytical system to compensate for the effects on the optical analysis caused by the presence of the various reagents and the other constituents in the sample material. These adjacent primary and secondary reaction sites are analyzed simultaneously by a double-beam detection station which includes a light source and a light beam splitter. The splitter will divide the single light beam into two beams, of like quality, one of which passes through the primary reaction site and the other of which passes through the secondary reaction site. The beams then pass to a detection mechanism which, as previously indicated, is responsive to the variations in light intensity caused by transmission through different liquid materials and which receives each of these transmitted light beams independently of the other. A corresponding voltage is generated for each beam which can then be correlated by appropriate electronic circuitry i.e. a difference amplifier to provide a final output voltage which is indicative of the concentration of a known constituent in the reaction site and under analysis. If one wishes to conduct an extremely precise analysis and take into consideration every possible influencing factor, additional reaction sites can be provided on the tape for the introduction of such factors and the analysis thereof in a split-beam detection mechanism wherein the number of split beams is equal to the number of reaction sites. Thus, the primary and secondary reaction sites have the foregoing materials added thereto while a third reaction site may have a standard solution added thereto, a fourth reaction site may have diluted reagent added thereto, etc. In this exemplary discussion, the primary reaction site will have all the necessary reagents plus sample; the secondary reaction site will have sample or sample plus one or more, but not all, of the stored reagents; and the third reaction site will be devoid of reagents, while the fourth reaction site will have all the reagents in the absence of sample material. Accordingly, it should be appreciated that the nature of each reaction site will vary in accordance with the procedure involved and the accuracy desired.

Referring to FIG. 5, there is shown a magazine 12 for the storage of a plurality of analytical tapes 70, 72, 74, 76, 78 and 80. The tapes are wound, respectively, on storage reels 82, 84, 86, 88, 90 and 92. The plurality of tapes within the magazine are passed around guide rollers 94, 96, etc., through guide means 98 into sample addition station 16. The tapes are so positioned that after being unwound they are in parallel spaced relationship with each other. When utilizing a plurality of tapes, as shown in this figure, each tape has a separate drive means (not shown) which can be actuated to index each tape independently on the other tapes. In one embodiment, the tapes after passing through guide means 98 but before entering sample addition station 16 are brought to a separation station wherein a single testing unit is separated from the remaining portion of the analytical tape. When the drive means indexes a single tape one unit ahead of the remaining tapes a slicer 100 severs that unit from the remaining portion of the analytical tape. The severed unit is then carried by a transport mechanism to the sample addition station, the incubation station, the detection station and the disposal station in that order. The severed entity may contain a single reaction site or a plurality of reaction sites as, previously described. For added flexibility, the incubation station can be partitioned into a plurality of compartments, each of which has different ambient conditions. Prerecorded data on a portion of the severed chemical testing unit can be provided to direct the unit to the proper compartment within the incubation station thereby establishing the proper incubation period and conditions for the procedure being run.

In a further embodiment utilizing a plurality of analytical tapes, each tape has regularly spaced reaction sites with apertures in between adjacent reaction sites or adjacent sets of reaction sites, the apertures having dimensions substantially equal to the dimensions of the reaction sites. Each of the plurality of different analytical tapes had deposited thereon or impregnated therein reaction sites which are capable of being used to perform different chemical analytical procedures. In the associated apparatus, means are provided to index the plurality of tapes within the system, and specifically within the sample addition station and the detection station, to position a particular reaction site (or sites) in a first tape beneath the aligned apertures in the tapes, if any, above the first tape. In this manner, sample addition is made to the appropriate tape of the plurality of tapes having the proper reagents stored thereon for conducting the desired analysis and, in the detection station, for monitoring at least one of the physical properties of the liquid material held within the porous structure of the reaction site (or sites).

Figure 6:
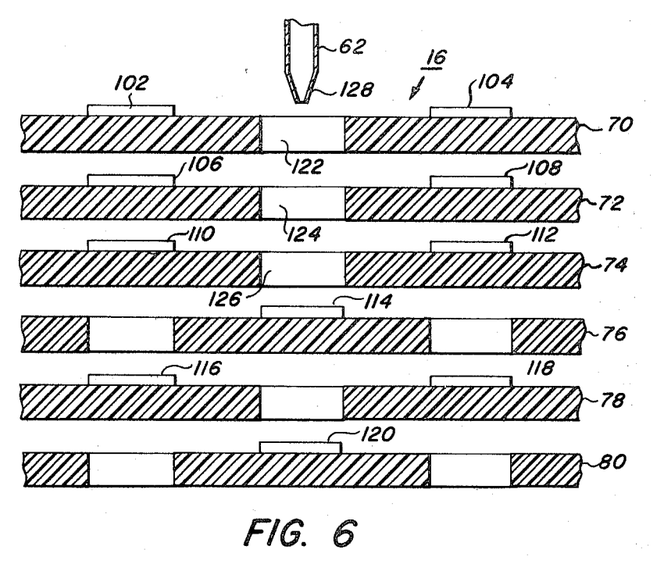
FIG. 6 is a greatly enlarged side sectional view of six apertured analytical tapes while in the sample addition station.

Referring to FIG. 6, there is seen an enlarged side sectional view of six analytical tapes 70, 72, 74, 76, 78 and 80 while said tapes are in the sample addition station 16. In this embodiment each tape has a plurality of reagent-containing discs disposed on the upper surface thereof with a single aperture spaced midway between each reagent-containing disc. Tape 70 has reagent-containing discs 102 and 104; tape 72 has discs 106 and 108; tape 74 has discs 110 and 112; tape 76 has disc 114; tape 78 has discs 116 and 118; and tape 80 has disc 120. As shown, tape 70, 72, and 74 have been indexed, in accordance with instructions from command tape 32, so that apertures 122, 124 and 126, respectively, are aligned directly under tip 128 of measuring tube 64. Prior to this alignment aliquoter 62 has withdrawn a measured portion of liquid sample contained in one of the pods of sample holding tape 24. Aliquoter 62 then revolves, to a position shown in FIGS. 1 and 2, so that tip 128 is directly over a reagent-containing disc on one of the analytical tapes. Such a disc may be on the uppermost tape or on one of the lower tapes as shown in FIG. 6. The tip of the measuring tube is lowered and the liquid sample material is deposited from tube 62 onto the appropriate disc. The liquid sample is preferably withdrawn from the measuring tube by applying slight pressure thereto to force the liquid out of the tube through tip 128 or it can be withdrawn by capillary action. Measuring tube 62 is preferably made from a non-wetting plastic which will not retain portions of the liquid sample after the sample addition step. As shown in FIG. 6, the sample material will be deposited upon disc 114 because of the alignment of the apertures in tape 70, 72, and 74. Had an aperture in tape 76 been aligned under tip 128 then the sample would have been deposited upon disc 120. Through proper indexing, portions of a particular sample can be deposited upon one or more of a plurality of different reaction sites supported by different analytical tapes.

From sample addition station 16 the analytical tapes pass through incubation station 18 wherein the material within the reaction site is maintained for a period of time sufficient to bring it to the desired state for analysis. The station should be of sufficient length whereby the deposited material will be held at the appropriate conditions for the proper amount of time. The proper incubation time is achieved by causing the drive means to index at a different rate thereby providing different incubation times for each particular reaction site. Alternatively, loops can be provided to lengthen the path of tape travel through the incubation station thereby increasing the incubation time without the necessity of modifying the rate at which the drive means operates. Additionally, since a plurality of analytical tapes are being utilized, the incubation station may be partitioned into a plurality of different zones, each having its own particular ambient conditions. Thus, it will be appreciated that many modifications can be made at this point to bring the reaction mixture to the desired state for the spectrophotometric analysis.

Figure 7:
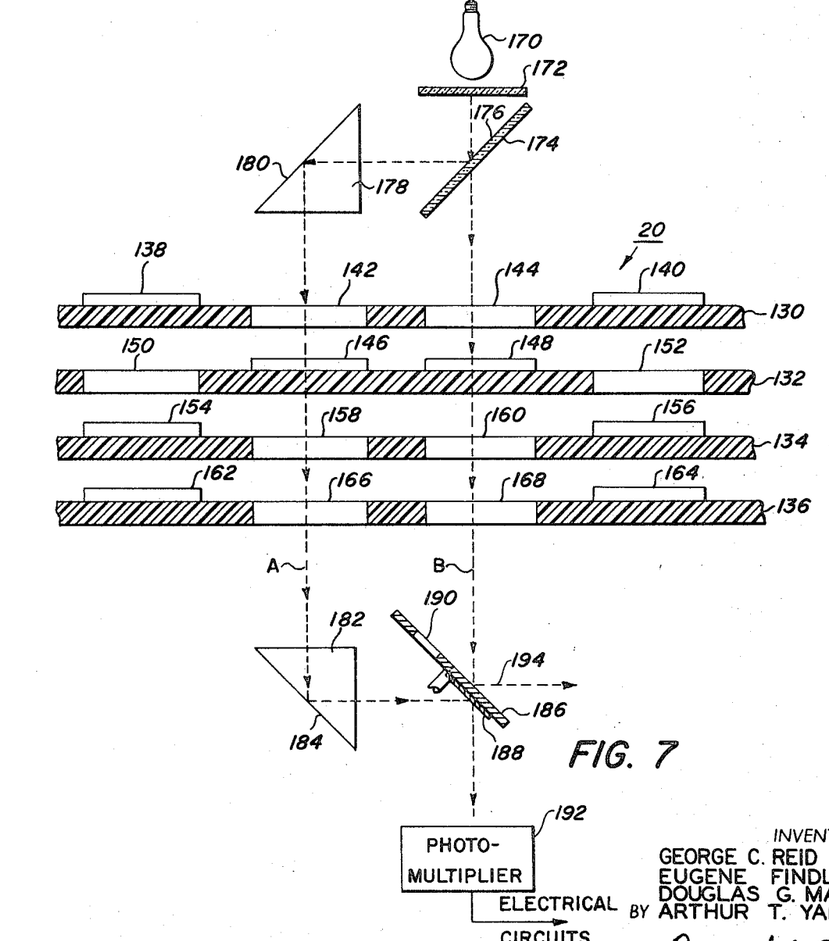
FIG. 7 is a greatly enlarged side sectional view of six different apertured analytical tapes while in the detection station.

Referring to FIG. 7, a double beam detection station is shown having tapes 130, 132, 134 and 136 passing therethrough. Each tape has alternating pairs of reaction sites and apertures. Tape 130 has discs 138 and 140 and apertures 142 and 144; tape 132 has discs 146 and 148 and apertures 150 and 152; tape 134 has discs 154 and 156 and apertures 158 and 160; and tape 136 has discs 162 and 164 and apertures 166 and 168. In one of the pairs of discs there is stored the necessary reagents for conducting the desired analysis and, to that end, sample is added thereto in the sample addition station. The other disc can have a standard solution added thereto to assist in calibration of the detection mechanism or sample can be added thereto to provide a "critically incomplete blank" as hereinabove described. This latter reaction mixture will enable the analytical system to compensate for the effects on the optical analysis caused by the presence of the various reagents and the other constituents in the sample material. By proper indexing, the reaction mixture-containing disc 146 and disc 148 can be aligned under the apertures, such as apertures 142 and 144, in tapes in between the tape under analysis and a source 170 of electromagnetic radiation. The radiant energy from source 170 passes through filter 172 to provide light of a desired wavelength or wavelengths. As each different analysis may require light of a different wavelength, a bank of filters can be positioned between the source 170 and the plurality of tapes. During analysis, however, only the proper filter will be in the optical path between the source and the discs under analysis, the other filters being displaced from their operative position. The radiant energy beam after passing through filter 172 falls upon half silvered mirror 174 having a semi-reflecting and semi-transmitting surface 176. One half of the radiant energy from the source 170 is reflected by surface 176 to prism 178 having a totally reflecting surface 180. The other half of the light from source 170 is transmitted through the surface 176 to pass outwardly through mirror 174. Because of this arrangement, there results two parallel radiant energy beams A and B, one of which passes through disc 146 while the other passes through disc 148. Beam A after passing through disc 146 and supporting tape 132 and apertures 158 and 166 in underlying tapes 134 and 136, respectively, falls upon prism 182 having a totally reflecting surface 184 which reflects the light so that now it is traveling perpendicular to the path of travel of beam B. Simultaneous with beam A passing through disc 146, beam B is passing through disc 148, supported by tape 132, and apertures 160 and 168 in tapes 134 and 136, respectively. A rotating shutter 186 driven by a motor (not shown) and having a total reflecting surface 188 and an aperture 190 is so positioned that the plane of the shutter bisects the angle formed by the intersection of beams A and B. The aperture 190 is defined by two semicircular arcs of different radii on the same half of the shutter and portions of the diameter of the shutter on opposite sides of the center thereof. The total reflecting surface 188 is of like dimensions and positioned on the side of the shutter facing photomultiplier 192. Total reflecting surface 188 is so positioned in the path of beam A that it will be reflected therefrom towards photomultiplier 192 during one-half of a revolution of the shutter. Aperture 190 is so positioned that beam B will be totally reflected along path 194 as beam A is being reflected towards the photomultiplier. During the other half of the revolution of shutter 186 beam B passes through aperture 190 to the photomultiplier. At the same time that beam B is passing through aperture 190 on its way to photomultiplier 192, beam A will also be passing through the aperture in a direction perpendicular to the path of travel of beam B. Thus, beam A and beam B will fall upon the photomultiplier unit independent of each other creating independent electrical signals with the difference between these signals being indicative of the amount of a component in the sample.

The analytical tape of the present invention has a supporting substrate, such as paper, cellulose acetate or Mylar (polyethylene terephthalate). Preferably, the supporting substrate is color free and highly transparent to the radiant energy which will be utilized in the analysis of the reaction site supported thereby; however, materials, such as paper, which are uniformly translucent can be used if sufficiently strong so as not to be torn during the movement of the tape through the analytical system.

The actual positioning of the reaction sites on the analytical tape is not critical. However, when it is contemplated that a plurality of apertured analytical tapes will be utilized simultaneously, similar positioning should be practiced so that the plurality of tapes can be properly indexed in the sample addition station and the detection station. Thus, a reagent-containing disc can be placed adjacent a reaction site which is used for control analysis, with the pair of reaction sites being separated from the next pair by two apertures disposed further along the longitudinal axis of the analytical tape. Instead of disposing the reaction sites solely along the longitudinal axis of the analytical tape, two or more reaction sites can be placed side by side. In an apertured tape, each row of reaction sites would then be separated from the next row of sites by a row of apertures, the center of each site and each aperture being on one of a plurality of lines extending the length of the analytical tape.

The reaction site of the present invention may take on many forms. In the simplest form, the supporting substrate of the analytical tape is porous or, at least, capable of being impregnated with the necessary reagent or reagents with the result that the reagents are stored within a particular area in the supporting tape. Preferably, this area is enclosed with a hydrophobic barrier, such as paraffin wax, which will prevent the transfer or diffusion of liquid sample and/or reagents from the reaction site. If the supporting substrate is not porous or not capable of accepting and storing deposited reagents, a reaction site is provided on one surface thereof for the storage of the analytical reagents. In one form, a layer can be cast over the total surface area of the supporting substrate. For example, the reagents can be stored in reaction sites in a uniformly coated gel matrix, the gel being permeable to sample constituents. Suitable gels and gel forming materials include hydroxy methyl cellulose, hydroxy ethyl cellulose, silica gel, polyvinyl alcohol, gelatin, polyacrylamides, and agar-agar. The reagents are mixed with the viscous gel material in a water-base system, coated onto the supporting substrate and then permitted to dry. Besides gel or gel forming materials other porous materials, such as paper, can be impregnated with the necessary reagents and then bonded to the supporting substrate. Preferably, the reaction site is a reagent-containing disc firmly bonded to the analytical tape. Such discs would correspond to the discs previously discussed with reference to FIGS. 6 and 7. The nature of the reagent-containing disc will depend entirely upon the reagents and operations necessary to conduct the desired analysis. The reagent-containing disc can be, as with the tape previously described, a porous material or a material capable of accepting and storing impregnated reagents therein. The word "porous" here is meant to include well-known porous materials, such as paper, as well as the gels or gel-forming materials referred to hereinabove. Thus, the reagent-containing disc can be a cellulosic paper having impregnated therein the necessary reagent or reagents for conducting the desired analysis in one step. Discs are then punched out from the treated paper and firmly bonded to the underlying substrate. For more complicated procedures, a plurality of layers of different composition (i.e., having different reagents stored therein) can be bonded together to provide for the sequential analysis of a particular liquid sample, each layer having its own stored reagents or performing its own particular function which corresponds to a step in the chosen analytical procedure. In addition, adjacent reagent-containing layers within the disc proper can be separated by an intermediate filter layer which will remove deleterious substances during the passage of the liquid reaction mixture as it permeates from one layer to the next. The multi-layered reagent-containing discs add great flexibility to the analytical procedures which can be conducted with the analytical system as herein disclosed.

Figure 8:
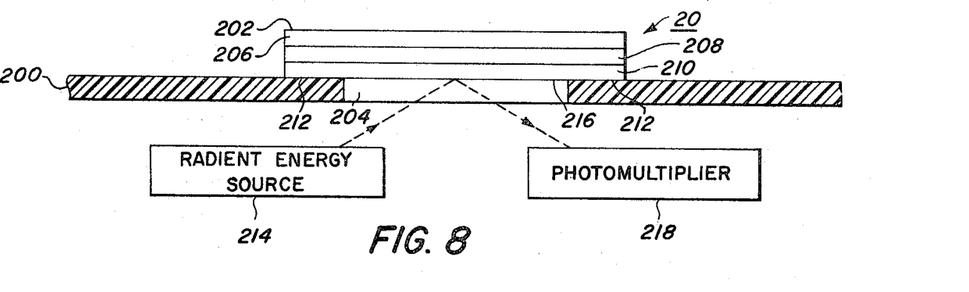
FIG. 8 is a greatly enlarged side sectional view of an apertured tape in the detection station, said tape having a multi-layered reagent-containing disc disposed over the aperture.

As previously indicated, the reagent-containing discs are punched out from the treated carrier and bonded to the supporting substrate, suitable bonding agents include adhesives such as polyvinyl acetate based adhesives, rubber cement, silicone adhesives including Dow Corning's No. 281 silicon adhesive, and other tackifiable materials. In the event that the bonding agent, which is utilized to adhere the reagent-containing disc to the supporting carrier, interferes with the optical analysis, then the reagent-containing disc is positioned over an aperture in the analytical tape. Referring to FIG. 8, there is seen a tape 200 having a multi-layered reagent-containing disc 202 over an aperture 204 in tape 200. Disc 202 has a first reagent layer 206, a second layer 208, and a third reagent layer 210. Alternatively, layer 208 can be a filter layer which will remove unwanted materials as the liquid sample passes from layer 206 to layer 210. Layer 210 includes a dye which will yield a color indicative of the concentration of the constituent under analysis in the liquid sample material. Because the adhesive bonding the disc 202 to the tape 200 at points 212 interferes with the optical analysis, the analysis proceeds by reflecting the radiant energy from source 214 off surface 216 to photomultiplier 218.

As contrasted with the impregnation of a porous material with a particular reagent or reagents, the present invention further contemplates as a preferred embodiment the chemisorption of the deposited reagent to its supporting carrier, whether it be a reaction site within the analytical tape per se, a uniformly cast layer, or the reagent-containing disc. Chemisorption is a physical phenomenon where, during absorption, there is electron transfer between the absorbate and the absorbant. However, as used in this application, the word "chemisorption" is meant to include not only where there is the strong chemical attraction existing because of the aforementioned electron transfer but also where the deposited material is actually reacted with the supporting carrier so that a functional moiety is chemically attached to the supporting carrier in areas of reagent deposition. The chemisorption process, examples of which will be given hereinafter, is of extreme importance because it prevents "ringing" when a solvent of body fluid or other sample material is later added to the reaction site during analysis. "Ringing" refers to the uneven distribution of reagent or reagent and sample after a solvent for the reagent has been deposited upon a reagent carrying reaction site. As the solvent spreads it washes the reagent away from the spot where the solvent was initially deposited. The ensuing uneven distribution of material with an area of lesser concentration in the center and an area of greater concentration about the periphery, where the solvent has carried the reagent and then evaporated, forms the "ringing" effect. This uneven distribution vitally affects measurements and is bound to cause errors during optical analysis. As noted above, the chemisorption process, as herein disclosed, eliminates this undesirable physical phenomenon, by chemically holding the reagent in place. Further, such a process completely obviates the need for a 3-tape structure as suggested by Natelson in U.S. Nos. 3,036,893; 3,216,804; 3,260,413; and 2,261,668. Whereas Natelson utilizes the uppermost tape to obtain uniform deposition of a liquid sample to the lowermost tape which contains the deposited reagent, the chemisorbed reagent-containing reaction site of the present invention can have the liquid sample added directly thereto without fear of "ringing" which would normally interfere with subsequent optical analysis.

The following examples are given to enable those skilled in the art to more clearly understand and practice the invention. They should not be considered as a limitation upon the scope of the invention but merely as being illustrative of techniques for producing reaction sites of the present invention.

EXAMPLE I

The following technique describes the production of a reagent-containing disc for the quantitative measurement of protein in a body fluid. A cellulose paper, such as Whatman Filter Paper No. 50, is first prewashed with acetone and then dipped for one minute, or until saturated, into a copper sulfate bath containing one part saturated copper sulfate solution to 3–7 parts distilled water. Next the paper is dipped into a 30% sodium hydroxide bath for about one minute or until the blue complex color is fully developed. Finally, the paper is dipped into a sodium potassium tartrate bath and then rinsed in distilled water. After the paper is dried, circular discs are punched out and bonded to a polyethylene terephthalate substrate. This sequential procedure produces a reagent-containing disc having the biuret complex uniformly chemisorbed within the porous matrix of the cellulose paper. In the preferred form of this process, a disc having the biuret complex uniformly distributed throughout the porous matrix is produced by conducting the process in the aforementioned sequential order. When the order of steps is altered, it has been found that the complex is still chemisorbed within the porous structure but the paper is not as uniform, and therefore not of high quality, as when the procedure is conducted in the sequence as given. Additionally, to further enhance uniformity, the porous matrix, such as the foregoing cellulose paper, should be prewashed with acetone before treating with the stated reagents. This, apparently, removes deleterious substances such as grease from the paper so that the alkali cellulose formed thereby the hydroxide can complex with the copper sulfate. The tartrate is a conventional reagent stabilizer in the $CuSO_4$-serum reaction analysis. Quantitative results have been achieved using the aforementioned tapes and reagent-containing discs with 5–10 microliters of serum (either uncut serum or serum diluted with distilled water), the reaction mixture being held on the disc in the incubation station for 2–5 minutes at 40° C. and then passed to a detection station where light of 540 millimicrons wavelength is passed onto and through the reaction mixture-containing discs.

As previously discussed, the reagent-containing discs as contemplated by this invention can be a single layer porous matrix impregnated with the necessary reagents (as in the example above) or, in the alternative, each disk can be a multiple-structure wherein each layer performs its own particular function corresponding to at least one step in the analytical procedure. The actual form of the reagent-containing discs will depend upon the particular analysis undertaken as well as the particular procedure to be followed in conducting that analysis. The preceding example is an illustration of a single layer reagent-containing disc wherein the final reagent is chemisorbed within the porous matrix. The following example is illustrative of the preparation of a multi-layered disc.

EXAMPLE II

The following technique describes the production of a multi-layered reagent-containing disc for the quantitative measurement of serum glutamic oxalacetic transaminase (SGOT) in blood. A reagent material known to those skilled in the art as the "substrate" is prepared by adding 33.5 grams of dibasic potassium phosphate and 1.0 gram monobasic potassium phosphate to 800 milliliters of distilled water. After the potassium phosphate is thoroughly dissolved, 7.05 grams of L-astartic acid, 1.0 gram alpha-ketoglutaric acid, and 1.0 milligram tetrasodium ethylene diamine tetraacetic acid is added to the solution. The pH of the solution is adjusted to 7.4 and the solution is diluted to one liter. A porous matrix, in this instance cellulosic paper, is thoroughly saturated with the substrate solution and thereafter dried or, preferably, first dehydrated with ethanol and then air dried. The substrate layer is then coupled to a cellophane dialysis membrane by using wet starch as a binding agent. It should be noted that other similar water-based adhesives, such as sugars, flour, are satisfactory in binding the dialysis membrane to the substrate layer. A third layer is prepared by dissolving Ponceau L dye in water until a saturated solution is obtained. The porous matrix to be impregnated, for example nylon paper or selica gel, is saturated with the solution, removed from the dye bath, immersed in ethanol for about 30 seconds to about one minute, immersed in ethyl ether to remove the ethanol and, after removal from the ether bath, the saturated paper is rapidly air dried. When using nylon (polyamide fiber) paper the Ponceau L dye is buffered to a pH of between 2–4.5 in order to get full color development during analysis. Nylon paper and silica gel both chemisorb the dye onto its surface in such a manner as to eliminate the adverse effects of "ringing." To impregnate silica gel into paper it is treated with an alkali hydroxide, such as sodium hydroxide or potassium hydroxide, to produce sodium silicate. The cellulosic paper, such as Whatman Filter Paper, is dipped into the sodium silicate solution thus converting a portion of the paper to alkali cellulose saturated with sodium silicate. The treated paper is next dipped into an acid bath which reconverts the sodium silicate to silica gel which is now uniformly deposited within the porous matrix of the cellulosic paper. The paper is air dried and distilled water rinsed to remove excess acid and to lower the pH to approximately 4.5 (i.e., the pH of blood serum). The paper is dipped into a buffered saturated solution of Ponceau L dye and then rapidly air dried. As the dye is chemisorbed onto the silica gel, no "ringing" exists when the sample material is added thereto. The chemisorbed dye layer is bonded to the exposed surface of the dialysis membrane with a water-based adhesive similar to the one utilized to bond the first two layers together. It should be noted that Ponceau L dye is light sensitive in solution, though somewhat less light sensitive as a solid; therefore, care should be taken to eliminate light exposure thus increasing the stability of the dye layer and preventing photodecomposition of the light sensitive dye. Circular discs are punched out from this laminated sheet and bonded to a transport tape. In operation, serum is added to the substrate layer in a quantity sufficient to spread uniformly over that layer but insufficient to saturate it. The tape is drawn into an incubation zone where the serum in the substrate layer is held at 40° C. to react the SGOT with the substrate for approximately 15 minutes to form oxalacetic acid. Upon removal from the incubation station, distilled water is added to the substrate layer to saturate that layer thereby causing the oxalacetic acid to diffuse into and through the dialysis membrane and into the dye-containing layer. It should be noted that large molecules, such as protein, cannot diffuse through the dialysis membrane and, therefore, cannot interfere with the colorimetric action of the dye. The oxalacetic acid having passed through the dialysis membrane is incubated with the Ponceau L dye for approximately ten minutes to allow for full color development. After these incubation steps, the tape is passed to the detection station wherein the optical density of the third layer is measured by reflectance of light 455 millimicrons wavelength. Since the concentration of SGOT in the sample material is proportional to the optical density at this particular wavelength, quantitative measurements have been made using this technique.

It has been found that the alkali cellulose forms an excellent chemisorption substrate for any alkaline side reagent while the nylon and preferably the silica gel are used with acetic reagents.

While the invention has been described with reference to preferred embodiments thereof, it will be understood by those skilled in the art that various changes in form and details may be made without departing from the true spirit and scope of the invention. For example, many forms of mass transfer can be utilized to move the reaction mixture from the upper layer of a multi-layered reaction site to a lower layer. Thus, while the addition of distilled water has been one form of mass transfer disclosed, other forms such as electrophoresis, osmosis, etc. can be utilized for the same purpose. Further, it is contemplated that any analytical procedure can be adapted to the herein disclosed invention. While the apparatus and system herein disclosed is particularly suitable for routine blood chemistry, such as glucose, blood urea nitrogen, albumin, bilirubin, total protein, SGOT, etc. numerous other analytical tests which are run periodically in any chemical environment can be automatically performed in accordance with the aforesaid disclosure.

Accordingly, all substitutions, additions, and modifications to which the present invention is readily susceptible, without departing from the spirit and scope of this disclosure, are considered part of the present invention.

What is claimed is:

1. An analytical apparatus comprising a sample carrier including a plurality of sample storage sites, each sample storage site in said sample carrier adapted to carry a plurality of measured portions of sample material, means to advance said carrier past a sample transfer station, means to advance an analytical tape bearing a plurality discrete reagent-containing sites, means at the transfer station to transfer at least one measured portion of sample material from one of said storage sites directly to a discrete reagent-containing site on the analytical tape, said sample carrying advancing means adapted to advance said sample carrier after all sample transfer is complete, and detection means further along the path of analytical tape travel to monitor at least one of the physical properties of the reaction mixture within the discrete re-agent-containing site.

2. The analytical apparatus of claim 1 further including means along the path of analytical tape travel to incubate the reaction mixture within the discrete reagent-containing site for a period of time sufficient to bring the reaction mixture to the desired state for analysis.

3. The analytical apparatus of claim 1 wherein said sample carrier comprises a tape having a plurality of sample storage pods formed therein.

4. The analytical apparatus of claim 1 further including a second detection means different from said first detection means, said second detection means being positioned further along the path of sample carrier travel, said second detection means including means to withdraw a portion of liquid sample from a sample storage site and means to analyze said sample portion.

5. The analytical apparatus of claim 1 wherein said detection means includes means to split a single light beam into a plurality of beams, means to direct each of said plurality of light beams through adjacent discrete reaction sites, means responsive to the variations in light transmittance caused by the different absorbtivity of incident light by each material within each adjacent discrete reaction site, and means to cause each of said light beams to be incident upon said responsive means independent of the other of said plurality of light beams.

6. The automated analytical apparatus of claim 1 further including means for reading data stored on the analytical tape adjacent each discrete reaction site and indicating a particular analytical procedure stored therein and for causing a material to be analyzed in accordance with that procedure to be deposited on the reaction site.

7. The analytical apparatus of claim 1 further including means disposed adjacent said sample carrier for indicating the next sample storage site to which sample material is to be added.

8. The analytical apparatus of claim 7 wherein said indicator means has an aperture therein, said aperture being aligned over an underlying sample storage site whereby sample addition is made through said aperture to said sample storage site.

9. The analytical apparatus of claim 1 further including a command tape having data thereon for instructing the apparatus to perform a particular analytical procedure upon a particular liquid sample.

10. The analytical apparatus of claim 9 further including a control panel for placing instructional data on said command tape.

11. An automated analytical apparatus comprising a sample carrier including a plurality of sample storage sites, means to move said carrier past a sample transfer station, means to store a plurality of apertured analytical tapes each bearing a plurality of different discrete reaction sites, means to advance the plurality of apertured tapes through a sample transfer station and a detection station, means at said transfer station to index the plurality of tapes so that liquid sample material can be added to a particular reaction site on any of said plurality of tapes, means at said transfer station to transfer a measured portion of a sample from one of said storage sites to the reaction site, said sample carrier advancing means adapted to advance said sample carrier after all sample transfer is complete, detection means in said detection station including a light source and a means responsive to the variations in light transmittance caused by different concentrations of a known constituent in each reaction mixture within each reaction site, and means at the detection station to index the plurality of tapes to position the sample containing reaction site in an unobstructed optical path between said light source and said responsive means.

12. The automated analytical apparatus of claim 11 further including means along the path of travel of the analytical tape to incubate the reaction mixture within the reaction site for a period of time sufficient to bring the reaction mixture to the desired state for analysis, said incubation means being partitioned into a plurality of compartments, each compartment having preset ambient conditions and having at least one reaction site-bearing analytical tape passing therethrough.

13. The automated analytical apparatus of claim 11 wherein each of the plurality of apertured analytical tapes has a separate advancing means.

14. The automated analytical apparatus of claim 11 further including means along the path of travel of the analytical tapes to incubate the reaction mixture within each discrete reagent-containing site for a period of time sufficient to bring each reaction mixture to the desired state for analysis by said detection means.

15. The automated analytical apparatus of claim 11 wherein said sample carrier advancing means is adapted to advance said sample carrier only after a plurality of measured portions of sample material have been transferred by said transfer means from a single storage site to each of a plurality of discrete reagent-containing sites.

16. An analytical tape comprising an elongated supporting substrate, said supporting substrate bearing a plurality of discrete reaction sites each containing at least one reagent, said supporting substrate further having a plurality of apertures therein, said apertures being substantially equal in number to the number of discrete reaction sites.

17. The analytical tape of claim 16 wherein an aperture is spaced midway between adjacent reaction sites.

18. The analytical tape of claim 16 wherein there are a plurality of apertures in said supporting substrate between a first set of reaction sites on one side of said apertures and a second set of reaction sites on the other side of said apertures, said apertures being equal in number to the number of reaction sites in said set, and the distance between each of said apertures and said reaction sites being substantially equal.

19. The analytical tape of claim 16 wherein a plurality of different reaction sites are disposed across the width of said supporting substrate thus defining a first row of reaction sites, said row being separated from the next adjacent row of reaction sites by a row of apertures disposed midway between the first row and the next adjacent row.

20. The analytical tape of claim 16 wherein said supporting substrate is transparent.

21. The analytical tape of claim 16 wherein said plurality of discrete reaction sites are situated along the longitudinal axis of said supporting substrate with an aperture spaced approximately midway between adjacent reaction sites.

22. The analytical tape of claim 16 wherein said reagent or reagents in each of said discrete reaction sites are chemisorbed therein, said chemisorbed reagent or reagents being characterized by the absence of reagent ringing in the reaction site when liquid material in test quantities is added thereto.

23. An analytical tape comprising a supporting substrate bearing a plurality of discrete reaction sites, each of said reaction sites comprising a reagent-containing disc bonded to the supporting substrate, said reagent-containing disc comprising a porous matrix having at least one reagent uniformly distributed therein, said supporting substrate having a plurality of apertures therein, each of said discs being disposed over an underlying aperture.

24. An analytical tape comprising a supporting substrate bearing a plurality of discrete reaction sites, each of said reaction sites having a porous matrix and at least one reagent chemisorbed therein, said chemisorbed reagent or reagents being characterized by the absence of reagent ringing in the reaction site when liquid material in test quantities is added thereto.

25. The analytical tape of claim 24 wherein the reagent is chemisorbed within the porous matrix of the supporting substrate.

26. The analytical tape of claim 24 wherein the porous matrix is selected from the group consisting of cellulosic paper, polyamide paper and silica gel uniformly distributed throughout a carrier matrix.

27. The analytical tape of claim 24 wherein the reagent is chemisorbed within the porous matrix of a reaction disc which is bonded to the supporting substrate.

28. The analytical tape of claim 27 wherein a reaction disc is disposed over an aperture in said supporting substrate.

29. The analytical tape of claim 27 wherein the reagent disc has a plurality of layers, upper or intermediate layers being in overlying contact with the next adjacent layer therebeneath.

30. The analytical tape of claim 29 wherein a spectrophotometric dye is chemisorbed in the lowermost layer.

31. The analytical tape of claim 29 wherein at least one layer corresponds to a layer selected from the group consisting of a filter layer and a dialysis layer.

32. The analytical tape of claim 29 wherein a layer selected from the group consisting of a dialysis layer and a filter layer separates a reagent-containing layer from a dye-containing layer.

33. The analytical tape of claim 29 wherein each of said layers is of substantially equal area such that material added to the uppermost layer will be transmitted to and uniformly distributed over the lowermost layer.

34. An analytical apparatus comprising a sample carrier including a plurality of sample storage sites, each sample storage site in said sample carrier adapted to carry a plurality of measured portions of sample material, means to advance said carrier past a sample transfer station, means to advance an analytical tape bearing plurality of discrete reagent-containing sites, means at the transfer station to transfer a plurality of measured portions of sample material from one of said storage sites directly to each of a plurality of discrete reagent-containing sites on the analytical tape, said sample carrier advancing means adapted to advance said simple carrier only after a plurality of measured portions of sample material have been transferred by said transfer means from a single storage site, and detection means further along the path of analytical tape travel to monitor at least one of the physical properties of each reaction mixture within each discrete reagent-containing site.

35. An automated analytical apparatus comprising a sample carrier including a plurality of sample storage sites, means to advance said carrier past a sample transfer station, means to store a plurality of analytical tapes each bearing a plurality of discrete reaction sites, means to advance each of said plurality of tapes to a separation station wherein separation means operate to sever individual test segments each containing at least one discrete reaction site from the remaining portion of each analytical tape, means to advance the individual test segment through a sample transfer station and a detection station, means at said transfer station to transfer a measured portion of a sample from one of said storage sites to each discrete reaction site on said individual test segment, said sample carrier advancing means adapted to advance said sample carrier after all sample transfer is complete, and detection means further along the path of individual test segment travel to monitor at least one of the physical properties of each reaction mixture within each discrete reaction site.

36. An automated analytical system including an analytical tape having a plurality of discrete reaction sites, each reaction site having stored therein the necessary reagents for conducting a particular analytical procedure, a station for the transfer of a plurality of measured portions of a sample material to be analyzed from a single sample storage site directly to each of a plurality of discrete reaction sites, an incubation station wherein the reaction mixture within each reaction site is maintained for a period of time sufficient to bring each reaction mixture to the desired state for analysis, a detection station for monitoring at least one of the physical properties of each reaction mixture within each reaction site, and means to advance said analytical tape from said sample transfer station through said incubation station to said detection station.

37. The automated analytical system of claim 36 wherein the system further includes means to advance the sample carrier only after a plurality of measured portions of sample material have been transferred in said transfer station from a single sample storage site to said plurality of discrete reaction sites.

38. The automated analytical system of claim 36 further including a control station for reading data stored on the analytical tape adjacent each discrete reaction site and indicating a particular analytical procedure stored therein and for causing a particular sample material which is to be analyzed according to that procedure to be added to the proper discrete reaction site.

39. The automated analytical system of claim 36 further including a station for the storage of a plurality of analytical tapes, each analytical tape having a plurality of discrete reaction sites and means to advance each of said plurality of analytical tapes independently of the other of said plurality of tapes; and wherein said incubation station is partitioned into a plurality of compartments, each compartment having preset ambient conditions and having at least one reaction site-bearing analytical tape passing therethrough.

40. The automated analytical system of claim 39 wherein each analytical tape has at least one aperture disposed between adjacent reaction sites, said system further including means at said transfer station to index the plurality of tapes so that liquid sample material can be added to a particular reaction site on any of said plurality of tapes and means at said detection station to index the plurality of tapes to position a sample containing reaction site in an unobstructed optical path suitable for anlaysis.

References Cited

UNITED STATES PATENTS

| | | |
|---|---|---|
| 3,036,894 | 5/1962 | Forestiere. |
| 3,232,710 | 2/1966 | Rieckmann et al. |
| 3,036,893 | 5/1962 | Natelson ________ 23—253 XR |
| 3,260,413 | 7/1966 | Natelson ________ 23—253 XR |
| 3,266,298 | 8/1966 | Whitehead et al. ___ 23—253 XR |
| 3,368,872 | 2/1968 | Natelson ________ 23—253 |

MORRIS O. WOLK, Primary Examiner

R. E. SERWIN, Assistant Examiner

U.S. Cl. X.R.

23—292